United States Patent [19]

Hoge

[11] Patent Number: 4,906,535
[45] Date of Patent: * Mar. 6, 1990

[54] ELECTROCHEMICAL CATHODE AND MATERIALS THEREFOR

[75] Inventor: William H. Hoge, Flemington, N.J.

[73] Assignee: Alupower, Inc., Warren, N.J.

[*] Notice: The portion of the term of this patent subsequent to Dec. 5, 2006 has been disclaimed.

[21] Appl. No.: 287,482

[22] Filed: Dec. 20, 1988

Related U.S. Application Data

[63] Continuation-in-part of Ser. No. 70,183, Jul. 6, 1987, Pat. No. 4,885,217.

[51] Int. Cl.$^4$ .................... H01M 4/88; H01M 4/96
[52] U.S. Cl. .................... 429/42; 427/115; 29/623.3
[58] Field of Search .................... 429/27, 42; 427/115; 29/623.3

[56] References Cited

U.S. PATENT DOCUMENTS

| | | | |
|---|---|---|---|
| 3,600,230 | 8/1971 | Stachurski et al. | 429/27 |
| 4,341,848 | 7/1982 | Liu et al. | 429/27 |
| 4,477,539 | 10/1984 | Struthers | 429/27 |
| 4,615,954 | 10/1986 | Solomon | 429/27 |

Primary Examiner—Donald L. Walton
Attorney, Agent, or Firm—Louis E. Marn

[57] ABSTRACT

There is disclosed a process for producing an electrochemical cathode for an electrochemical cell comprised of a current collecting layer or substrate laminated between layers of a nonwoven conductive fibrous web, preferably of conductive carbon fibers, impregnated with a mixture of carbon particles and a nonfibrous polymeric substance, and optionally with a hydrophobic microporous film or layer disposed on one of the layers of the nonwoven conductive fibrous web as well as the product produced thereby.

26 Claims, 1 Drawing Sheet

U.S. Patent    Mar. 6, 1990    4,906,535
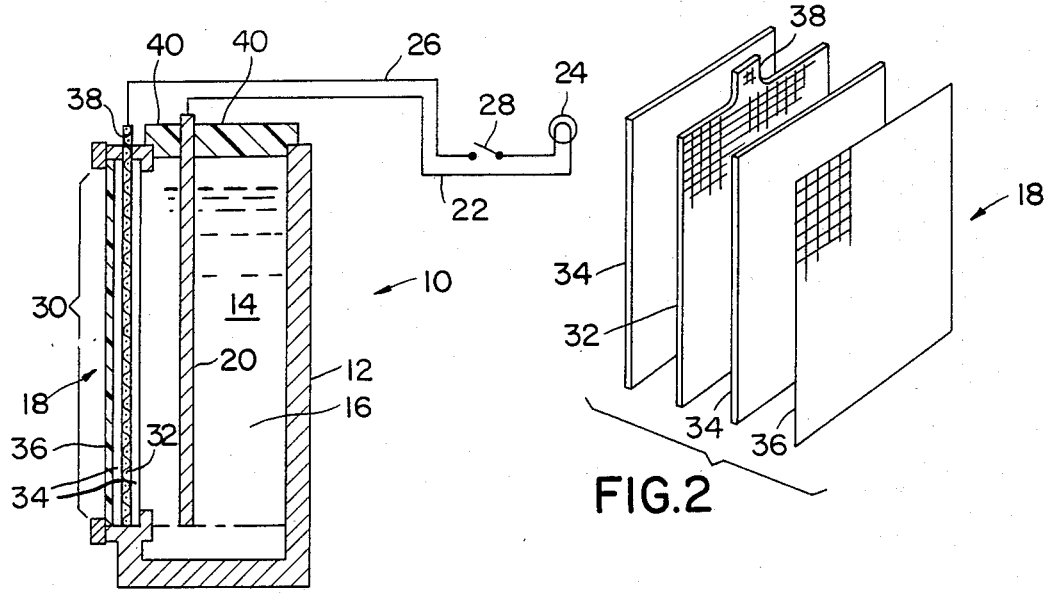
FIG.1
FIG.2
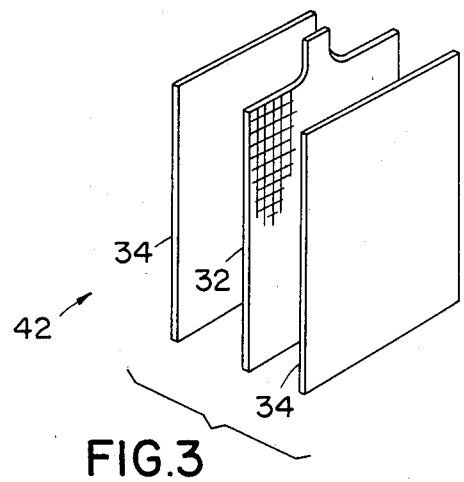
FIG.3

ELECTROCHEMICAL CATHODE AND MATERIALS THEREFOR

BACKGROUND OF THE INVENTION

Related Applications

This is a continuation-in-part of application Ser. No. 07/070,183, filed July 6, 1987, U.S. Pat. No. 4,885,217.

Field of the Invention

This invention relates to a process for manufacturing electrodes and electrodes produced thereby, and more particularly to a process for manufacturing electrochemical cathodes for use in electrochemical cells and electrochemical cathodes produced thereby.

Description of the Prior Art

Metal/air batteries produce electricity by electrochemically coupling in a cell a reactive metallic anode to an air cathode through a suitable electrolyte. As is well known in the art, an air cathode is a typically sheet-like member having opposite surfaces respectively exposed to the atmosphere and to an aqueous electrolyte of the cell, in which (during cell operation) atmospheric oxygen dissociates while metal of the anode oxidizes providing a usable electric current flow through external circuitry connected between the anode and cathode. The air cathode must be permeable to air but substantially hydrophobic (so that aqueous electrolyte will not seep or leak through it), and must incorporate an electrically conductive element for external circuitry.

In present-day commercial practice, the air cathode is commonly constituted of active carbon (with or without an added dissociation-promoting catalyst) containing a finely divided hydrophobic polymeric material and incorporating a metal screen as the conductive element. A variety of anode metals are used including iron, zinc, magnesium, aluminum, alloys of aluminum, etc. Alloys of aluminum and magnesium are considered especially advantageous for particular applications owing to low cost, light weight and ability to function as anodes in metal/air batteries using neutral electrolytes, such as sea water or other aqueous saline solutions. Metal/air batteries have an essentially infinite shelf-storage life rendering them very suitable for standby or emergency uses in that the metal-air battery may be activated by immersing the electrode in an electrolyte.

In the aforementioned copending application Ser. No. 07/070,183, there is disclosed an air cathode comprised of a sheetlike laminate including first and second layers having opposed major surfaces, respectively, exposed for contact with a liquid electrolyte and with air and facing major surfaces. The second layer is permeable to air but not to a liquid electrolyte. A current-collecting layer is in contact with the first layer and is connected to external electrical circuitry. The first layer of the cathode is comprised of a nonwoven fibrous web, preferably of conductive carbon fibers, impregnated with a mixture of carbon particles and a nonfibrous polymeric substance for holding the carbon particles in the web.

The facing major surfaces of the first and second layers are bonded together by heat seal coating material distributed on facing major surfaces in manner to provide an array or network of areas free of coating material extending substantially uniformly thereover with the coating material being distributed as a multiplicity of spaced-apart dots, or as a mesh having coating-material-free interstices. Coating-free spaces maintains sufficient unclogged pores in the second layer to enable the air cathode to function as intended, yet with effective lamination of the layers to each other and/or to the current-collecting means, such as a layer of metal mesh interposed between and coextensive with the first and second layer.

While such an air cathode have been effective there is a tendency to delaminate, and thus it is desirable to form air cathodes using readily available raw materials, under facile processing condition where the air cathodes are more reliable for intended use with extended shelf life.

OBJECTS OF THE INVENTION

An object of the present invention is to provide an improved cathode for electrocemical cells.

Another object of the present invention is to provide an improved electrochemical cathode for electrochemical cells providing improved electrochemical characteristics.

A further object of the present invention is to provide an improved electrochemical cathode for electrochemical cells exhibiting improved resistance to delamination.

Still another object of the present invention is to provide a novel process for producing an improved cathode for electrochemical cells.

Yet another object of the present invention is to provide a novel process for producing an improved cathode for electrochemical cells exhibiting improved electrochemical characteristics, such as improved corrosion resistance.

A still further object of the present invention is to provide a novel process for producing an improved cathode for electrochemical cells at nominal temperature ranges.

SUMMARY OF THE INVENTION

These and other objects of the present invention are achieved by a process for producing an electrochemical cathode for an electrochemical cell comprised of a current collecting layer or substrate laminated between layers of a nonwoven impregnated with a mixture of carbon particles and a nonfibrous polymeric substance, and optionally with a hydrophobic microporous film or layer disposed on one of the layers of the nonwoven conductive fibrous web as well as the product produced thereby.

BRIEF DESCRIPTION OF THE DRAWINGS

Other features and advantages of the present invention will become more readily apparent from the following detailed description when taken with the accompanying drawings wherein;

FIG. 1 is a schematic elevational sectional view of an electrochemical metal/air battery incorporating an electrochemical cathode of one embodiment of the present invention;

FIG. 2 is a schematic exploded view of the embodiment of an electrochemical cathode of FIG. 1; and FIG. 3 is a schematic exploded view of another embodiment of an electrochemical cathode, such as for a lithium battery, of the present invention.

DETAILED DESCRIPTION OF THE INVENTION

Referring now to FIG. 1, there is illustrated a metal-/air battery, generally indicated as 10 comprised of a housing 12 defining a chamber 14 for receiving a liquid electrolyte 16, such as an aqueous solution of sodium chloride; an air cathode, generally indicated as 18, and a metal anode 20. The anode 20 is connected by line 22 to a light bulb 24 connected by line 26 including a switch 28 to the air cathode 18. The housing 12 defines a large vertical aperture 30 for receiving the air cathode 18 in liquid-tight fashion with the periphery of the air cathode 18 sealed to the periphery of the aperture 30 of the housing 12. Closing of the switch 28 closes an electrical circuit formed between the air cathode 18 and the anode 20 via the electrolyte 16 thereby illuminating the light bulb 24.

The air cathode 18 is a laminate structure comprised of a metal mesh substrate 32, reactive layers 34 laminated to the mesh substrate 32 and a hydrophobic microporous layer 36 mounted to the outer reactive layer 34. The metal mesh 32, is the current collector of the metal/air battery 10, and is formed of a suitable metallic material, such as nickel, stainless steel and the like, formed for example by expanded metal techniques and includes an upwardly extending tab portion 38 for connection to line 26.

The anode 20, may be formed of a suitable anodic material, such as aluminum, magnesium or the like, and is illustrated as being disposed in a top 40 of the housing 12 in the form of a plate member extending vertically into the chamber 14 including the electrolyte 16. The anode 20 is longitudinally disposed with reference to the housing 12 and is spaced apart in parallelled relationship to the air cathode 18 a distance sufficient to form a gap therebetween for the electrolyte 16. The general arrangement of the metal/air battery 10 may be substantially the same as that of one of the cells of the plural-cell battery, such as described in U.S. Pat. No. 4,626,482 hereby incorporated by reference.

In FIG. 3, there is illustrated an electrochemical cathode, generally indicated as 42, constituting another embodiment of the present invention and a laminate structure comprised of the metal mesh substrate 32 laminated between an inner reactive layer 34 and an outer reactive layer 34 without any hydrophobic microporous layer mounted to an outer reactive layer 34. Such embodiment of the present invention finds application in the lithium battery art.

The reactive layer 34 is comprised of a conductive nonwoven fibrous web impregnated with a mixture of carbon particles and a nonfibrous polymeric substance for holding the carbon particles in the web. Other substances e.g. catalyst, may also be included in the impregnating mixture. The nonwoven fibrous web of the present invention is preferably formed of electrically conductive carbon fibers having a length of from about 0.5 to 1.25 inches and a diameter of from about 5.0 to 15.0$\mu$. The carbon content of such carbon fibers is preferably at least about 90 weight percent exhibiting a resistance of less than about 20 ohms/sq.

The conductive nonwoven fibrous web is formed into a thickness of from 5 to 20 mils. exhibiting a pore volume of at least about 90 percent, to provide a high pick-up of the impregnation mixture whether in suspension or in a coating format. The impregnation mixture should increase the basic weight of the conductive nonwoven fibrous web by about 20 to 120 g./m.$^2$. as a function of solids content of the impregnation suspension or coating and pore volume of the conductive nonwoven fibrous web, and provide a front-to-back (F/B) electrical conductivity of less than about 1 ohm.

The impregnation mixture, in the form of a suspension or coating, is comprised of carbon particles, generally in the form of carbon black, a nonfibrous adhesive polymeric material to bind the carbon particles to the web and a dispersion or mixing agents. The carbon particles are preferably of small size, expressed as surface area (m.$^2$/g.), generally in excess of 1000, and preferably greater than about 1250, such as Black Pearls 2000, available from Cabot Corporation having a mean particle diameter of 0.015$\mu$.

The nonfibrous adhesive polymeric materials include the polytetrafluoroethylenes, such as Teflon ® T-30, a registered trademark of duPont. The dispersion or mixing agents include the sodium salt of polymeric naphthalene sulfonic acid and those included with the polytetrafluoroethylene (PTFE).

The conductive nonwoven web of carbon fibers is impregnated by immersion, coating extrusion or the like, with the aqueous suspension of the impregnation mixture of the carbon particles, nonfibrous polymeric substance and other desired nonfibrous ingredients, e.g. a catalyst. A catalyst, such as potassium permanganate, may be added to the impregnation mixture to improve (or reduce) polarization voltage of the resulting cathode. Generally, potassium permanganate is added in an amount of from 8 to 20%, preferably above 12% based upon dried weight of carbon dispersion solids and dispersion agent. Silver oxide has also been found to be an effective catalyst in the system of the present invention.

The impregnated conductive nonwoven fibrous web is dried at a temperature of from about 150° F. to 400° F., a temperature below the sintering temperature of the binder material, i.e. the PTFE, and a temperature high enough to ensure substantially complete moisture removal.

The microporous or hydrophobic layer 36 is a film or web permeable to air but impermeable to the solvent of the electrolyte system to prevent or minimize penetration of the electrolyte through the air cathode to the exterior of the metal/air battery 10 with concomitant disappearance of active interface sites. The hydrophobic layer 36 is laminated on the reactive layer 34 for intended use particularly in conjunction with liquid electrolytes. It has been found that a film of polymeric hydrophobic material, such as films of polytetrafluoroethylene of a thickness of from 2 to 10 mils embossed with mesh of a netted configuration of 1/30th" to ⅛" diameter provides particularly desirable hydrophobic properties while concomitantly providing for effective diffusion of a gaseous fuel. Embossing of the polymeric hydrophobic layer may be readily effected by passage through an embossing roller assembly maintained at a temperature of from 150° F. to 300° F., generally at a temperature to compact the film at the contact points or areas of the embossing roll. Wire mesh used to form the current collector layer has been found effective in embossing the polymeric hydrophobic layer.

As disclosed in the aforementioned copending application, the layers of the air cathode laminate 18 are bonded by a discontinuous heat seal coating applied to the reactive layers as a discontinuous dot matrix system or an interposed layer of meshed coating material to be subsequently heated and subjected to a pressure step during passage of the air cathode laminate through a pressure roller system (not shown). Bonding of a reactive layer to the metal mesh substrate is particularly effectively performed by passing the metal mesh substrate 38 through a liquid solution or dispersion of a sealing material prior to lamination with a reactive layer 34. In this aspect of the present invention, the sealing material is a Teflon ® dispersion in water.

The reactive layers 34 with seal coating either applied as a dot pattern on inner facing major surfaces or heat seal netting material (not shown) interposed are juxtaposed to the current collecting substrate 32 in a "sandwich" of layers, and the sandwich subjected to bonding heat and pressure sufficient to activate the heat seal coating to bond the reactive layers 34 to the metal substrate 32. The materials of the electrochemical cathode are selected such that activation temperatures of the heat-seal coating to bond the layers does not damage any layers or component substance, generally a temperature less than 250° F. The hydrophyllic layer 36 may be simultaneously laminated to one of the reactive layers 34 as part of the laminate sandwich, or in a separate but like bonding step. Once the layers are bonded, the resulting laminate is cut to size to provide the individual electrochemical cathodes.

The process of the present invention is set forth in the following specific examples which are intended to be merely illustrative and the present invention is intended not to be limited thereto.

EXAMPLE I

A conductive nonwoven web of carbon fibers (International Paper Company), is introduced into a continuous web machine to effect coating and drying operations. The impregnated mixture (carbon/Teflon ®) is comprised of 36 gms. of an aqueous dispersion of Black Pearls (carbon) 2000 (15% solids) and 0.9 gms. Teflon ® T-30 (60% solids) applied at a solids content of 12.0%. Impregnation is effected to provide an add-on of 60 GSM. The resulting impregnated layers and fine nickel mesh (Delker) precoated with an adhesive are passed through an oven maintained at a temperature of from 200° F. to 300° F. and thence web and passed through laminating rolls at nip pressure of 600 pounds per lineal inch at a temperature of 250° F. to form an electrochemical cathode suitable for use in an electrochemical battery.

EXAMPLE II

The procedure set forth in Example I is similarly followed except that 3.2 gms of Teflon ® T.30 and 18 gms of a 0.4% solution of potassium permanganate (12% based on solids content) is added to the impregnation mixture and is observed to react within a few minutes. The resulting cathode had a polarization voltage at least 10% less than a non-catalyst system and is particularly suitable for use in a lithium electrochemical battery.

EXAMPLE III

The procedures set forth in both EXAMPLES I and II similarly followed except that a hydrophobic polymeric (Teflon ®) film is included in the sandwich to be laminated, i.e. included against a side of one of the impregnated webs to form a four layered electrochemical cathode suitable for use in the laminate of each Example is preheated at 180° F. with the microporous polymeric film and passed through laminating rolls at a temperature of 200° F.

EXAMPLE IV

The procedure as set forth in EXAMPLE III is similarly followed except an embossed roll is used and the laminate sandwich is resented so that the hydrophobic film comes into contact with the polymeric film.

While the invention has been described in connection with an exemplary embodiment thereof, it will be understood that many modifications will be apparent to those of ordinary skill in the art; and that this application is intended to cover any adaptations of variations thereof. Therefore, it is manifestly intended that this invention be only limited by the claims and the equivalents thereof.

What is claimed:

1. An electrochemical cathode, which comprises:
   a current collecting substrate capable of being connected to electrical circuitry; and
   conductive nonwoven webs laminated to said current collecting substrate and impregnated with a mixture of carbon particles and a nonfibrous polymeric substance for holding said carbon particles in said web, said conductive nonwoven web being formed of conductive carbon fibers.

2. The electrochemical cathode as defined in claim 1 and further including a hydrophobic polymeric film bonded to one of said conductive nonwoven webs.

3. The electrochemical cathode as defined in claim 1 or 2 wherein said carbon fibers are of a diameter of from about 5.0 to 15.0$\mu$.

4. The electrochemical cathode as defined in claim 3 wherein said carbon fibers are of a length of from about 0.5 to 1.25 inches.

5. The electrochemical cathode as defined in claim 1 or 2 wherein said carbon fibers of said conductive nonwoven web exhibit a resistance of less than about 20 ohms/sq.

6. The electrochemical cathode as defined in claim 1 or 2 wherein said conductive nonwoven web provides a front-to-back electrical conductivity of less than about 1 ohm.

7. The electrochemical cathode as defined in claim 1 or 2 wherein said carbon particles have a surface area greater than about 1000 m.$^2$/g.

8. The electrochemical cathode as defined in claim 1 or 2 wherein said current collecting substrate is metal mesh.

9. The electrochemical cathode as defined in claim 1 or 2 wherein said current collecting substrate is bonded by a sealing material to said conductive nonwoven webs.

10. The electrochemical cathode as defined in claim 9 wherein said sealing material is a dispersion of PTFE.

11. The electrochemical cathode as defined in claim 2 wherein said hydrophobic polymeric film is embossed onto said conductive nonwoven web.

12. The electrochemical cathode as defined in claim 2 or 11 wherein said hydrophobic polymeric film is formed of polytetrafluoroethylene.

13. The electrochemical cathode as defined in claim 1 or 2 wherein said mixture includes a catalyst.

14. The electrochemical cathode as defined in claim 13 wherein said catalyst is selected from the group consisting of potassium permanganate and silver oxide.

15. A process for forming an electrochemical cathode, which comprises:
   (a) impregnating a conductive nonwoven fibrous web with a dispersion comprised of carbon particles and a nonfibrous polymeric material for holding said carbon particles to said web.

(b) laminating a current collecting substrate between layers of said impregnated web to form said electrochemical cathode.

16. The process for forming an electrochemical cathode as defined in claim 15 and further including the steps of forming and drying a sandwich of said current collecting substrate and said layers of said impregnated web prior to step (b).

17. The process for forming an electrochemical cathode as defined in claim 16 wherein drying is effected at a temperature of from 200° F. to 300° F.

18. The process for forming an electrochemical cathode as defined in claim 15, 16 or 17 wherein said current collecting substrate is coated with a polytetrafluoroethylene dispersion.

19. The process for forming an electrochemical cathode as defined in claim 18, wherein laminating is effected at a temperature of about 150° F. to about 400° F.

20. The process for forming an electrochemical cathode as defined in claim 15 wherein said nonfibrous polymeric material is polytetrafluoroethylene.

21. The process for forming an electrochemical cathode as defined in claim 15 and further including a polymeric film in said sandwich in contact with one of said layers of said impregnated web.

22. The process for forming an electrochemical cathode as defined in claim 16 and further including a polymeric film in said sandwich in contact with one of said layers of said impregnated web.

23. The process for forming an electrochemical cathode as defined in claim 21 or 22 wherein step (b) is effected with an embossing roller in contact with said polymeric film.

24. The process for forming an electrochemical cathode as defined in claim 21 or 22 wherein said current collecting substrate is coated with a polytetrafluoroethylene dispersion prior to step (b).

25. The process for forming an electrochemical cathode as defined in claim 24 wherein drying is effected at a temperature of from 200° F. to 300° F.

26. The process for forming an electrochemical cathode as defined in claim 25 wherein step (b) is effected with an embossing roller in contact with said polymeric film.

* * * * *

UNITED STATES PATENT AND TRADEMARK OFFICE
CERTIFICATE OF CORRECTION

PATENT NO. : 4,906,535
DATED : MARCH 6, 1990
INVENTOR(S) : WILLIAM H. HOGE

It is certified that error appears in the above-identified patent and that said Letters Patent is hereby corrected as shown below:

Column 2, line 46, after "nonwoven", insert -- conductive fibrous web, preferably of conductive carbon fibers, --.

Claim 15, column 7, line 2, delete "." and insert -- ; and --

Signed and Sealed this

Eleventh Day of June, 1991

Attest:

HARRY F. MANBECK, JR.

*Attesting Officer*   *Commissioner of Patents and Trademarks*